(12) United States Patent
Leier et al.

(10) Patent No.: US 10,246,132 B2
(45) Date of Patent: Apr. 2, 2019

(54) TORQUE REACTION FRAME FOR MITIGATION OF REAR IMPACT EFFECTS

(71) Applicant: GM GLOBAL TECHNOLOGY OPERATIONS LLC, Detroit, MI (US)

(72) Inventors: Bradley Leier, Troy, MI (US); Anne M. Stibich, Troy, MI (US); Bharath Kumar Baburajan, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 147 days.

(21) Appl. No.: 15/362,975

(22) Filed: Nov. 29, 2016

(65) Prior Publication Data

US 2018/0148096 A1 May 31, 2018

(51) Int. Cl.
  *B62D 21/15* (2006.01)
  *B60K 1/00* (2006.01)
(52) U.S. Cl.
  CPC .............. *B62D 21/152* (2013.01); *B60K 1/00* (2013.01)
(58) Field of Classification Search
  CPC .................................. B62D 21/152; B60K 1/00
  USPC ..................... 296/187.08, 193.07, 204, 30
  See application file for complete search history.

(56) References Cited

U.S. PATENT DOCUMENTS

| 4,899,843 A * | 2/1990 | Takano ................... B60K 5/12 180/312 |
| 5,133,427 A * | 7/1992 | Arvidsson ............ B60K 5/1216 180/297 |
| 5,466,005 A * | 11/1995 | Kohlmeier ............... B60G 7/02 180/311 |
| 5,803,533 A * | 9/1998 | Schulz .................... B62D 21/00 296/204 |
| 5,915,495 A * | 6/1999 | Kerlin ................... B62D 21/183 180/291 |
| 6,834,910 B2 * | 12/2004 | Wendland ............ B62D 21/152 296/187.01 |
| 7,090,290 B2 * | 8/2006 | Neumeier .............. B62D 21/00 280/793 |
| 8,282,146 B2 * | 10/2012 | Izutsu .................. B62D 25/087 296/187.11 |
| 8,813,883 B2 * | 8/2014 | Fujiwara .................. B60K 6/46 180/312 |
| 8,894,134 B2 * | 11/2014 | Tomozawa ............... B60K 5/00 180/291 |
| 9,623,911 B2 * | 4/2017 | Kano .................... B62D 21/155 |
| 2002/0096384 A1 * | 7/2002 | Yoshida ................... B60K 5/12 180/298 |
| 2007/0096508 A1 * | 5/2007 | Rocheblave ......... B62D 21/152 296/193.07 |

(Continued)

*Primary Examiner* — Jason S Morrow
*Assistant Examiner* — E Turner Hicks

(57) ABSTRACT

A device for rear impact mitigation of a vehicle is disclosed herein. In some embodiments, the device includes a Y-shaped frame having a first leg, a second leg, and a reaction member, the reaction member having a first end and a second end, the first leg and the second leg extending from the first end of the reaction member at a first area and defining an angle therebetween, the reaction member having a straight portion proximate the first end and a curved portion defining a second area proximate the second end, wherein the frame is configured to deform at one or more of the first area and the second area upon application of a force from a rear impact event to the vehicle.

20 Claims, 3 Drawing Sheets

(56) References Cited

U.S. PATENT DOCUMENTS

| | | | |
|---|---|---|---|
| 2009/0001767 A1* | 1/2009 | Yamaguchi | B60K 15/063 296/203.04 |
| 2010/0052368 A1* | 3/2010 | Yamaguchi | B62D 25/087 296/203.04 |
| 2012/0292124 A1* | 11/2012 | Yamashita | B60K 1/00 180/291 |
| 2015/0353136 A1* | 12/2015 | Kramer | B62D 21/11 296/204 |

* cited by examiner

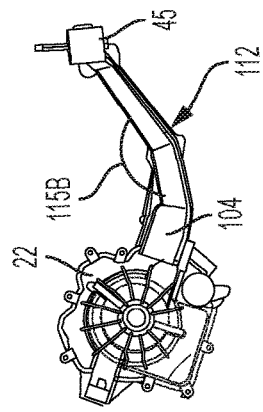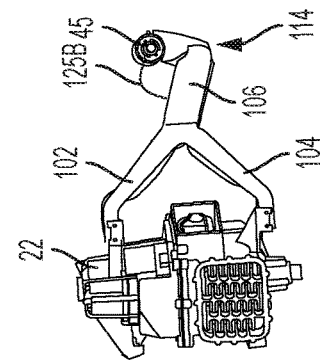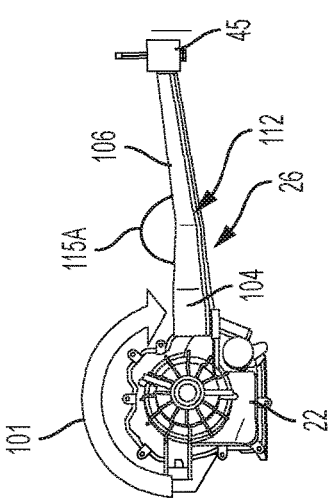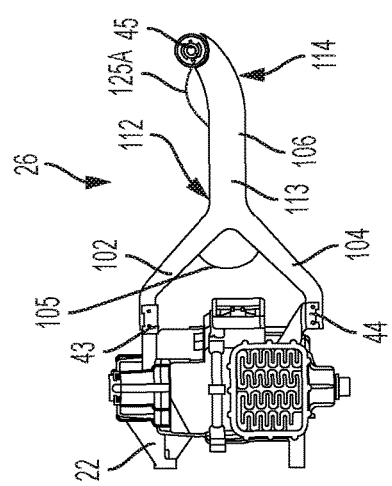

TORQUE REACTION FRAME FOR MITIGATION OF REAR IMPACT EFFECTS

INTRODUCTION

The present invention relates generally to the field of vehicles and, more specifically, to structural chassis components that mitigate the effects of a rear impact crash.

Electric vehicles include an electric rear drive module (eRDM) as part of or as the sole source of vehicle propulsion. The eRDM receives signals from a controller and electricity from a power source to convert electrical energy into rotational energy that is transmitted to the rear wheels of the vehicle. When a vehicle is subject to a rear impact, movement of the eRDM due to the impact forces can cause harsh contact between the eRDM and other rear-mounted components of the vehicle, including the fuel tank, fuel cell, and/or battery pack. Accordingly, it is desirable to provide a system for reducing or preventing damage to these and other components due to impact forces from a rear impact event.

SUMMARY

Embodiments according to the present disclosure provide a number of advantages. For example, embodiments of the structural chassis components according to the present disclosure reduce or prevent damage to rear-mounted components, such as a fuel tank, fuel cell, and/or a battery module, due to contact from the eRDM.

In one aspect, a device for rear impact mitigation of a vehicle is disclosed. The device includes a Y-shaped frame having a first leg, a second leg, and a reaction member, the reaction member having a first end and a second end, the first leg and the second leg extending from the first end of the reaction member at a first area and defining an angle therebetween, the reaction member having a straight portion proximate the first end and a curved portion defining a second area proximate the second end, wherein the frame is configured to deform at one or more of the first area and the second area upon application of a force from a rear impact event to the vehicle.

In some aspects, the first area is configured to deform in a plane perpendicular to a plane defined by the reaction member. In some aspects, the second area is configured to deform in a plane defined by the reaction member.

In some aspects, the second end of the reaction member includes a bolted connection point. In some aspects, the bolted connection point is offset from a line defined by the straight portion of the reaction member. In some aspects, the second area is configured to deform upon application of a force such that the device pivots about the bolted connection point.

In another aspect, an automotive vehicle includes a chassis; a rear drive module having a housing, the housing having a first end and a second end, the first end proximate to a first side of the vehicle and the second end proximate to a second side of the vehicle opposite the first side; and a Y-shaped frame having a first leg, a second leg, and a reaction member, the reaction member having a first end and a second end, the first leg and the second leg extending from the first end of the reaction member at a first area and defining an angle therebetween, the reaction member having a straight portion proximate the first end and a curved portion defining a second area proximate the second end; wherein the first leg and the second leg are coupled to the housing and the reaction member is coupled to the chassis.

In some aspects, the housing includes a first mounting member proximate the first end and a second mounting member proximate the second end, and the first leg of the frame connects to the first mounting member and the second leg of the frame connects to the second mounting member. In some aspects, the reaction member is coupled to the chassis at a connection point. In some aspects, the connection point is a bolted connection between the reaction member and the chassis.

In some aspects, each of the first and second legs of the frame have a first width and the reaction member has a second width greater than the first width. In some aspects, the first area is configured to deform in a plane perpendicular to a plane defined by the reaction member and the second area is configured to deform in a plane defined by the reaction member.

In some aspects, the automotive vehicle further includes a storage component, wherein the bolted connection is forward of the storage component such that deformation of the frame prevents a collision between the rear drive module and the storage component.

In yet another aspect, a structural component of a vehicle includes a frame having a first leg, a second leg, and a reaction member, the reaction member having a first end and a second end, the first leg and the second leg extending from the first end of the reaction member at a first area, the reaction member having a straight portion proximate the first end and a curved portion defining a second area proximate the second end, wherein the frame is configured to deform at one or more of the first area and the second area upon application of a force from a rear impact event to the vehicle.

In some aspects, the first area is configured to deform in a plane perpendicular to a plane defined by the reaction member. In some aspects, the second area is configured to deform in a plane defined by the reaction member.

In some aspects, the second end of the reaction member includes a bolted connection point. In some aspects, the bolted connection point is offset from a line defined by the straight portion of the reaction member. In some aspects, the second area is configured to deform such that the structural component pivots about the bolted connection point. In some aspects, the bolted connection point connects the frame to a body member of the vehicle.

BRIEF DESCRIPTION OF THE DRAWINGS

The present disclosure will be described in conjunction with the following figures, wherein like numerals denote like elements.

FIG. 4A is a schematic side view of an electric rear drive module and a torque reaction frame in an undeformed shape, according to an embodiment.

FIG. 4B is a schematic side view of the electric rear drive module and torque reaction frame of FIG. 4A in a deformed shape, according to an embodiment.

FIG. 5A is a schematic bottom view of an electric rear drive module and a torque reaction frame in an undeformed shape, according to an embodiment.

FIG. 5B is a schematic bottom view of the electric rear drive module and torque reaction frame of FIG. 5A in a deformed shape, according to an embodiment.

Figure 1:
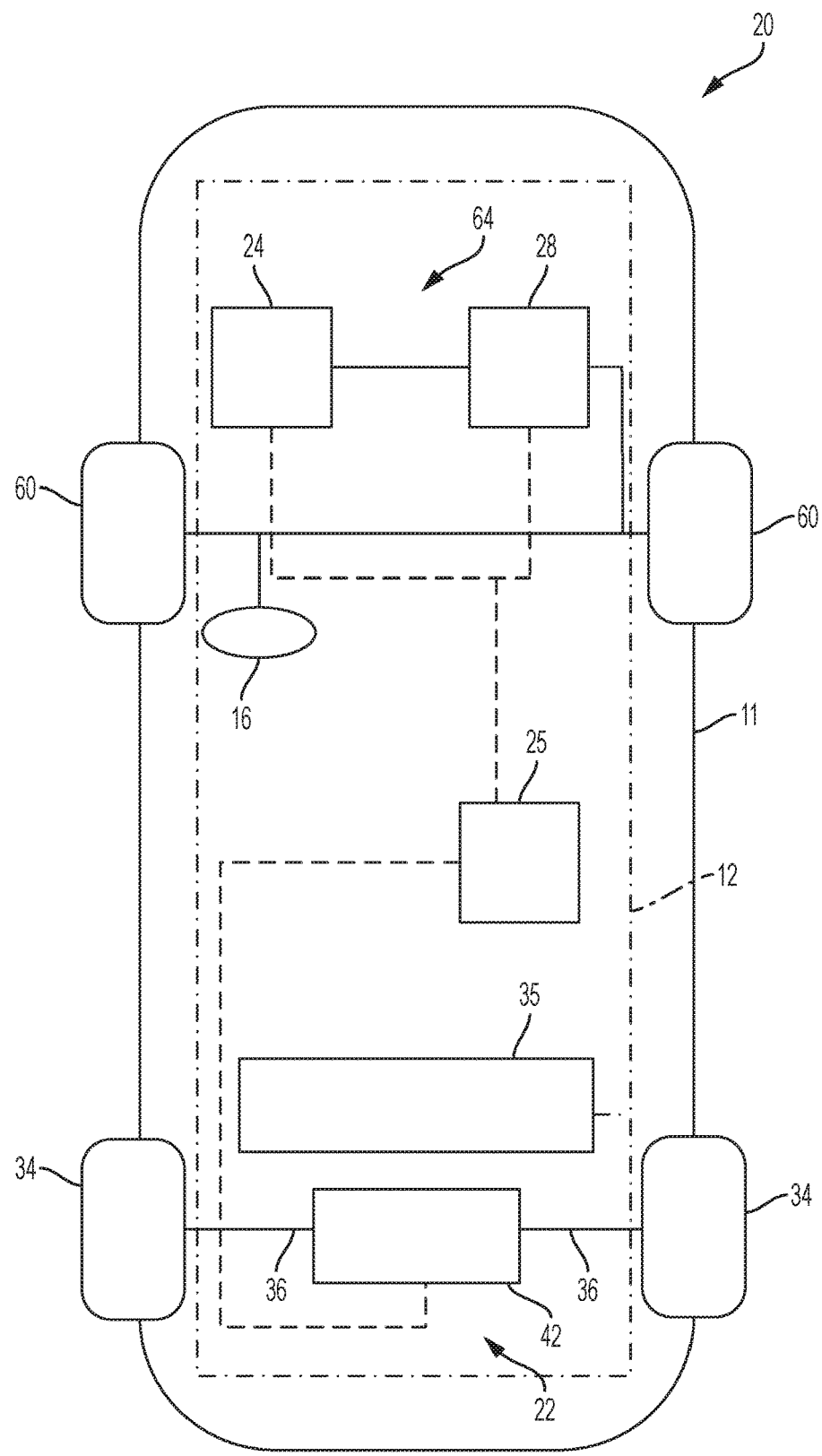
FIG. 1 is a schematic plan view of a vehicle having an electric rear drive module (eRDM), according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

When a vehicle is subject to a rear impact, movement of the electric rear drive module (eRDM) due to the impact forces can cause harsh contact between the eRDM and other rear-mounted components of the vehicle, including the fuel tank, fuel cell, and/or battery pack. A chassis structural component, such as the torque reaction frame discussed below, may be used with any electric rear wheel drive or four or all-wheel drive vehicle platform having an eRDM. The torque reaction frame provides a load path to distribute forces from a rear collision to prevent or reduce damage to rear-mounted components for vehicles that lack a mechanical connection or driveline between the front axle and propulsion system and the rear axle.

FIG. 1 illustrates a vehicle 20 having a front axle assembly 64 and an electric rear drive module (eRDM) 22. The eRDM 22 receives signals from a controller and electricity from a power source to convert electrical energy into rotational energy that is transmitted to the rear wheels of the vehicle 20. The vehicle 20 is depicted in the illustrated embodiment as a passenger car, but it should be appreciated that any other vehicle including trucks, sport utility vehicles (SUVs), recreational vehicles (RVs), etc. can also be used.

In some embodiments, the vehicle 20 includes a propulsion system 24, which may in various embodiments include an internal combustion engine, an electric machine such as a traction motor, and/or a fuel cell propulsion system. In some embodiments, the propulsion system 24 is electrically connected to a controller or control module 25. In some embodiments, the vehicle 20 also includes a transmission 28. According to various embodiments, the transmission 28 may include a step-ratio automatic transmission, a continuously-variable transmission, or other appropriate transmission. The transmission 28 may be configured to reduce the rotational velocity and increase the torque of the output from the propulsion system 24. In some embodiments, the vehicle 20 does not include a propulsion system 24 and power to the wheels of the vehicle 20 is provided by the eRDM 22. In some embodiments, the vehicle 20 does not include a transmission 28.

The propulsion system 24, the eRDM 22, the transmission 28, and the axle assembly 64 are coupled to a vehicle structure such as a chassis or frame 12. The propulsion system 24 is electrically coupled to the eRDM 22 via the controller 25. If a signal is received from the controller 25 indicating rear wheel or four wheel drive operation is desired, the eRDM 22 transmits an output torque to a pair of driven-wheels 34 via axles 36.

In some embodiments, the eRDM 22 includes a housing 42 such as a differential housing. For example, in an electric or hybrid-type vehicle, the eRDM may include electric motors that directly drive the wheels 34.

The vehicle 20 further includes a second set of wheels 60 arranged adjacent the propulsion system 24. In one embodiment, the second set of wheels 60 is also configured to receive output from the propulsion system 24. This is sometimes referred to as a four-wheel or an all-wheel drive configuration.

The force generated in rear impact events can be transmitted through the vehicle structure and cause damage to vehicle components. For vehicles that include a driveline connecting the propulsion system with the rear axle and a rear drive module, the force of a rear collision follows the load path defined by the driveline. As shown in FIG. 1, the vehicle 20 does not include a mechanical connection, such as a driveline, connecting the propulsion system 24 and the front axle to the eRDM 22 and the rear axles 36. For vehicles, such as vehicle 20, that do not have a mechanical connection between the propulsion system and the rear axle or axles, a separate structural chassis component can provide a load path for the transfer of force from a rear collision.

In some rear impact events, the force of a rear collision can displace and push the exhaust components and the eRDM 22 forward such that the eRDM 22 contacts a storage component such as a fuel tank, fuel cell, or battery module 35 of the vehicle 20. The contact can cause fuel leakage or damage to the battery module. Accordingly, a structural chassis component connected to the eRDM 22 can control the eRDM 22 kinematics and act as a countermeasure against the forces generated by a rear impact event and can reduce the risk of damage to the storage component 35, among other vehicle components.

Figure 2:
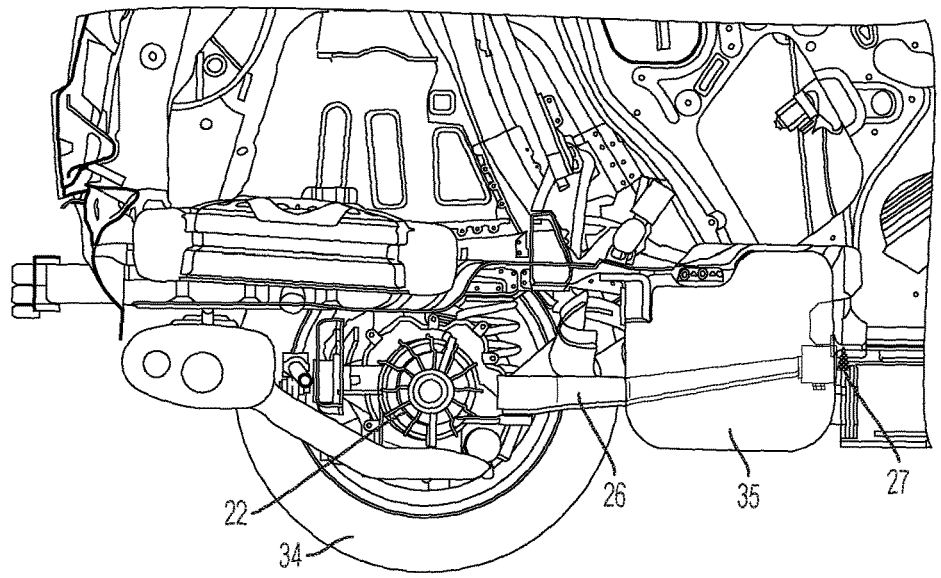
FIG. 2 is a schematic partial side view of a vehicle having an electric rear drive module and a torque reaction frame, according to an embodiment.

FIG. 2 is a partial side view of a vehicle, such as the vehicle 20, with the eRDM 22 connected to a torque reaction frame 26. The torque reaction frame 26 is a structural chassis component of the vehicle 20 connecting the eRDM 22 to a body or chassis cross-member 27 positioned, in some embodiments, beneath a second row of seats of the vehicle 20. The torque reaction frame 26 creates a load path to the vehicle body structure forward of the storage component 35 to reduce or prevent intrusion of the eRDM 22 into the storage component 35 or harsh contact between the eRDM 22 and the storage component 35. By creating a load path to the vehicle body structure in electric-driven vehicles with no mechanical connection to the front axle, the integrity of components such as the fuel tank, battery pack or module, or fuel cell is more likely to be maintained during rear impact events. The torque reaction frame 26 is configured to deform when loaded to reduce or prevent the eRDM 22 and other rearward mounted vehicle components, such as exhaust system components, from contacting and possibly damaging one or more storage components such as the fuel system, fuel cell, or battery module.

Figure 3:
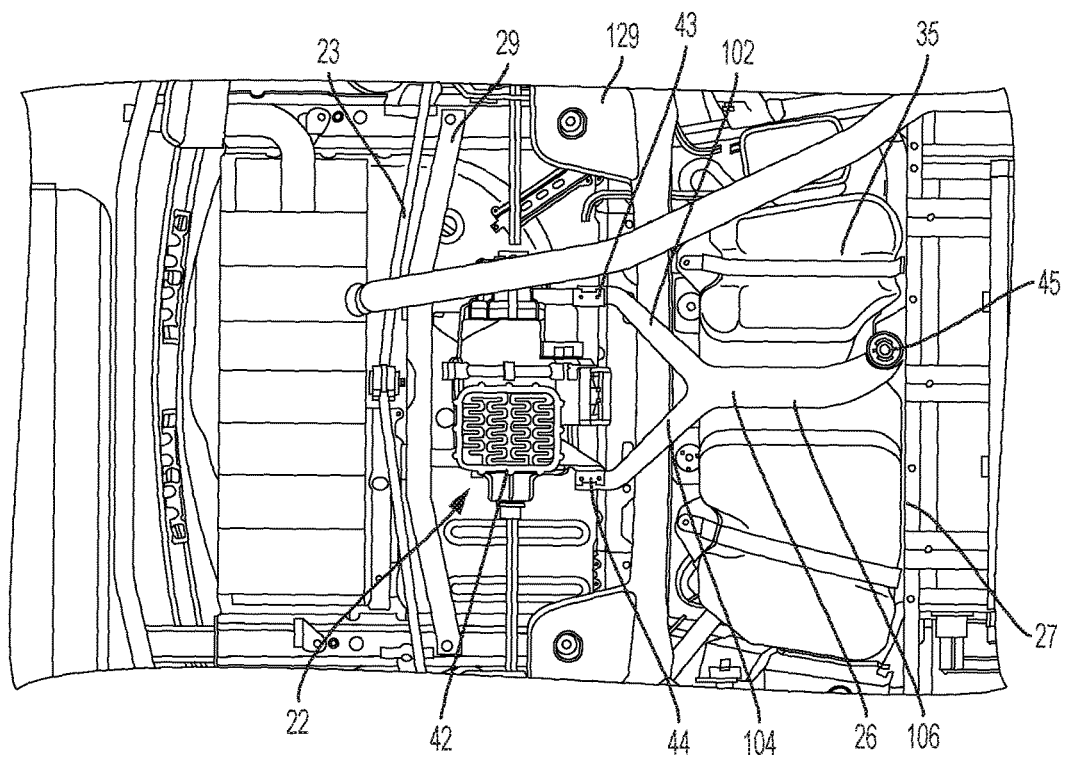
FIG. 3 is a schematic partial underside view of a vehicle having an electric rear drive module and a torque reaction frame, according to an embodiment.

With continued reference to FIGS. 2 and 3, the torque reaction frame 26 is shown as part of an eRDM drive system including, in some embodiments, a rear suspension Watt's linkage 23, a chassis Watt's link cross-member 29, and a compound crank rear suspension member 129. The torque reaction frame 26 is a substantially Y-shaped chassis structural member connecting the eRDM 22 to the vehicle structure forward of the storage component 35. The torque reaction frame 26 includes a first leg 102, a second leg 104, and a reaction member 106. Each of the first and second legs 102, 104 branch off from a first end of the reaction member 106. In some embodiments, a second and opposite end of the reaction member 106 is connected via a bolted connection 45 to the body or chassis cross-member 27. In some embodiments, the body or chassis cross-member 27 is forward of the storage component 35. In some embodiments, the body or chassis cross-member 27 is positioned below a second row seat of the vehicle 20. The reaction member 106 includes a straight portion proximate the first end and a curved portion proximate to the bolted connection 45 at the second end such that the bolted connection 45 is offset from a line defined by the straight portion of the reaction member 106. As discussed in greater detail below, the curved portion predisposes the reaction member 106 to deform substantially within a longitudinal plane defined by the legs 102, 104 and the reaction member 106 when subjected to the forces of a rear impact event. The legs 102, 104 assist in reacting to all rotational and translational loads, both tractive and from noise and vibration, between the eRDM and the chassis and vehicle structure.

The first and second legs 102, 104 of the torque reaction frame 26 are connected to the housing 42 of the eRDM 22 using any type of mechanical connecting means, including, for example and without limitation, bolts or screws. In some embodiments, the housing 42 includes a first mounting member 43 and a second mounting member 44. The first mounting member 43 is located on one side or end of the housing 42 and the second mounting member 44 is located on an opposite side or end of the housing 42. In some embodiments, the first leg 102 is connected to the first mounting member 43 using any type of mechanical fastener including, for example and without limitation, bolts or screws. In some embodiments, the first leg 102 is connected to the first mounting member 43 by a welded connection. In some embodiments, the second leg 104 is connected to the second mounting member 44 using any type of mechanical fastener including, for example and without limitation, bolts or screws. In some embodiments, the second leg 104 is connected to the second mounting member 44 by a welded connection.

FIGS. 4A, B and 5A, B illustrate side (4A, B) and bottom or underside (5A, B) views of the torque reaction frame 26 mounted to the eRDM 22. As discussed above, when the vehicle experiences a rear impact event, the forces generated by the impact can cause the eRDM 22 to impact other rear-mounted components, such as the fuel tank, a fuel cell, or a battery module. The impact of the eRDM 22 with these components can cause significant damage, including fuel leakage. The torque reaction frame 26 absorbs some of the energy generated by the impact through deformation and redirects the forces around the rear-mounted components to a body member forward of the rear-mounted components to prevent or reduce contact with the rear-mounted components.

In some embodiments, a deformation mode of the torque reaction frame 26 begins with a downward vertical bend at a first area defined by the intersection between the first and second legs 102, 104 and the reaction member 106 such that the torque reaction frame 26 deforms in a plane perpendicular to a plane defined by the reaction member 106. Following the initial vertical buckling of the torque reaction frame 26, a second area defined by the curved portion of the reaction member 106 buckles in planform such that the torque reaction frame 26 pivots about the bolted connection 45. This sequence of deformation events controls the kinematics of the eRDM 22, allowing the eRDM 22 to rotate about a lateral axis of the eRDM 22, diverting the eRDM 22 down and away from storage components such as the fuel tank, fuel cell, or battery pack of the vehicle. The secondary deformation event uses the torsional stiffness of the bushing connection of the eRDM 22 to the vehicle body cross-member to react to the applied load and allow the eRDM 22 to fold in on itself, avoiding bolt fracture and maintaining vehicle structure integrity.

FIGS. 4A and B illustrate a side view of the eRDM 22 and the torque reaction frame 26 before (FIG. 4A) and after (FIG. 4B) a rear impact event. The legs 102, 104 branch off from one end of the reaction member 106 at an intersection point 112 such that the torque reaction frame 26 is substantially Y-shaped. In some embodiments, the legs 102, 104 and the reaction member 106 are substantially planar prior to a rear impact event. As shown in FIG. 4A, an angle 115A is defined by the plane of the legs 102, 104 and the plane of the reaction member 106. The size of the angle 115A depends on the vehicle geometry, the desired stiffness of the torque reaction frame 26, and the size of the eRDM 22, among other considerations. In some embodiments, the angle 115A is approximately 180 degrees prior to a rear impact event. In some embodiments, the angle 115A is less than 180 degrees prior to a rear impact event. In some embodiments, the angle 115A is between approximately 170 and 190 degrees prior to a rear impact event.

When the vehicle experiences a rear impact event, the eRDM 22 can rotate around a lateral axis forward and downward, as shown by arrow 101 in FIG. 4A, due to the connection with the torque reaction frame 26. As shown in FIG. 4B, the torque reaction frame 26 absorbs at least some of the energy from the impact by deforming in a vertical/downward direction relative to the plane defined by the first and second legs 102, 104. The intersection point or area 112 defined by the vertex of the Y-shaped torque reaction frame 26 at the first end of the reaction member 106, that is, the intersection of the legs 102, 104 with the reaction member 106, deforms by translating vertically downwards in response to the applied force from the rear impact event. As shown in FIG. 4B, as the eRDM 22 is pushed forward by the forces of the impact (to the right in FIG. 4B), the eRDM 22 rotates forward and downward. The torque reaction frame 26, which is constrained at the pinned or bolted connection 45 with the cross member 27, deforms at the intersection area 112, forming a deformation angle 115B. The deformation angle 115B is smaller than the angle 115A. The deformation at the area 112 reduces intrusion of the eRDM 22 into the storage component 35 to minimize the risk of fuel leakage, battery module damage, or damage to a fuel cell.

FIGS. 5A and B illustrate a bottom view of the eRDM 22 and the torque reaction frame 26 before (FIG. 5A) and after (FIG. 5B) a rear impact event. The legs 102, 104 of the torque reaction frame 26 define an inclusive angle 105. The size of the angle 105 depends on the size of the eRDM 22 and the location of the mounting members 43, 44, among other considerations such as the vehicle geometry and the desired stiffness of the torque reaction frame 26. In some embodiments, the angle 105 is between approximately 45 and 60 degrees. In some embodiments, the angle 105 is at least approximately 30 degrees, at least approximately 40 degrees, or at least approximately 50 degrees. The angle 105 is selected to allow the proper kinematic balance of the e-RDM between rotation and intrusion.

As shown in FIGS. 5A and B, the reaction member 106 includes a straight portion or area 113 and a curved portion or area 114. The area 114 is curved such that the pinned or bolted connection 45 is not aligned with the vertex of the Y-shaped torque reaction frame 26, that is, where the first and second legs 102, 104 branch off from the reaction member 106 at the first end of the reaction member 106. In some embodiments, the pinned or bolted connection 45 is also not aligned with the straight portion of the reaction member 106. The area 114 may deform when subjected to forces from a rear impact event. The curved area 114 defines an undeformed angle 125A between the pinned or bolted connection 45 and the main body of the reaction member 106. The curved area 114 is designed to absorb at least some of the energy from a rear impact event by deforming within the plane substantially defined by the reaction member 106. As shown in FIG. 5B, the curved area 114 bends or crushes in approximately the same plane as the plane of the torque reaction frame 26 when viewed from underneath. The planform bending mode at the area 114 creates an angle 125B that is less than the angle 125A. Additionally, the planform bending mode at the area 114 limits shear and moment forces on the pinned or bolted connection 45 to minimize or prevent bolt failure and retain vehicle structural integrity.

The stiffness and geometry of the torque reaction frame 26, including the angles 105, 115A, and 125A, are tunable or adjustable depending on a variety of factors including, but not limited to, a stiffness of the bushing connection 45, the size of the eRDM 22, the vehicle type, and the height and mounting position of the eRDM. Additionally, the strength and stiffness of the legs 102, 104 and the reaction member 106 are adjustable and tunable to prevent or reduce the impact of the eRDM 22 into the storage component 35 and to prevent or reduce the occurrence of separation of the eRDM 22 from the vehicle. For example, if the torque reaction frame 26 is too stiff, the eRDM 22 will separate from the vehicle 20. If the torque reaction frame 26 is too flexible, the force of the collision will cause the eRDM 22 to impact one or more rear-mounted components. Therefore, the geometry of the torque reaction frame 26 is tunable to accommodate vehicle geometry and positioning considerations, among other factors.

The material, geometry, and method of construction of the torque reaction frame 26 depend on the vehicle type and mass and packaging constraints. In some embodiments, the torque reaction frame 26 is a solid structure formed from a metal or metal alloy, such as steel. In some embodiments, the torque reaction frame 26 is a tubular structure formed from a metal or metal alloy, such as steel. In some embodiments, the torque reaction frame 26 is cast or molded as a unitary structure. In some embodiments, the torque reaction frame 26 is formed by welding or otherwise connecting the legs 102, 104 and the reaction member 106.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A device for rear impact mitigation of a vehicle, comprising:
    a unitary Y-shaped frame having a first leg, a second leg, and a reaction member, the reaction member having a first end and a second end, the first leg and the second leg extending from the first end of the reaction member at a first area and defining an angle therebetween, the reaction member having a straight portion proximate the first end and a curved portion defining a second area proximate the second end and separated from the first end by the straight portion;
    wherein the frame is configured to deform at one or more of the first area and the second area upon application of a force from a rear impact event to the vehicle and the frame is coupled to the vehicle at a single connection point.

2. The device of claim 1, wherein the first area is configured to deform in a plane perpendicular to a plane defined by the reaction member.

3. The device of claim 1, wherein the second area is configured to deform in a plane defined by the reaction member.

4. The device of claim 1, wherein the second end of the reaction member includes a bolted connection point.

5. The device of claim 4, wherein the bolted connection point is offset from a line defined by the straight portion of the reaction member.

6. The device of claim 4, wherein the second area is configured to deform upon application of a force such that the device pivots about the bolted connection point.

7. An automotive vehicle, comprising:
    a chassis;
    a rear drive module having a housing, the housing having a first side and a second side, the first side proximate to a first side of the vehicle and the second side proximate to a second side of the vehicle opposite the first side; and
    a Y-shaped frame having a first leg, a second leg, and a reaction member, the reaction member having a first end and a second end, the first leg and the second leg extending from the first end of the reaction member at a first area and defining an angle therebetween, the reaction member having a straight portion proximate the first end and a curved portion defining a second area proximate the second end;
    wherein the first leg and the second leg are coupled to the housing and the reaction member is coupled to the chassis.

8. The automotive vehicle of claim 7, wherein the housing includes a first mounting member proximate the first side of the housing and a second mounting member proximate the second side of the housing, and the first leg of the frame connects to the first mounting member and the second leg of the frame connects to the second mounting member.

9. The automotive vehicle of claim 7, wherein each of the first and second legs of the frame have a first width and the reaction member has a second width greater than the first width.

10. The automotive vehicle of claim 7, wherein the reaction member is coupled to the chassis at a connection point.

11. The automotive vehicle of claim 10, wherein the connection point is a bolted connection between the reaction member and the chassis.

12. The automotive vehicle of claim 11, wherein the first area is configured to deform in a plane perpendicular to a plane defined by the reaction member and the second area is configured to deform in a plane defined by the reaction member.

13. The automotive vehicle of claim 12 further comprising a storage component, wherein the bolted connection is forward of the storage component such that deformation of the frame prevents a collision between the rear drive module and the storage component.

14. A structural component of a vehicle, comprising:
a one-piece frame having a first leg, a second leg, and a reaction member, the reaction member having a first end and a second end, the first leg and the second leg extending from the first end of the reaction member at a first area, the reaction member having a straight portion proximate the first end and a curved portion defining a second area proximate the second end, wherein the curved portion is separated from the first and second legs by the straight portion;
wherein the frame is configured to deform at one or more of the first area and the second area upon application of a force from a rear impact event to the vehicle and the frame is coupled to the vehicle at a single connection point.

15. The structural component of claim 14, wherein the first area is configured to deform in a plane perpendicular to a plane defined by the reaction member.

16. The structural component of claim 14, wherein the second area is configured to deform in a plane defined by the reaction member.

17. The structural component of claim 14, wherein the second end of the reaction member includes a bolted connection point.

18. The structural component of claim 17, wherein the bolted connection point is offset from a line defined by the straight portion of the reaction member.

19. The structural component of claim 18, wherein the second area is configured to deform such that the structural component pivots about the bolted connection point.

20. The structural component of claim 19, wherein the bolted connection point connects the frame to a body member of the vehicle.

* * * * *